United States Patent
Simpson

(10) Patent No.: US 10,757,425 B2
(45) Date of Patent: Aug. 25, 2020

(54) IMAGE ENCRYPTION THROUGH DYNAMIC COMPRESSION CODE WORDS

(71) Applicant: United States Postal Service, Washington, DC (US)

(72) Inventor: Ryan J. Simpson, Vienna, VA (US)

(73) Assignee: United States Postal Service, Washington, DC (US)

( * ) Notice: Subject to any disclaimer, the term of this patent is extended or adjusted under 35 U.S.C. 154(b) by 65 days.

(21) Appl. No.: 16/040,414

(22) Filed: Jul. 19, 2018

(65) Prior Publication Data

US 2019/0028719 A1 Jan. 24, 2019

Related U.S. Application Data

(60) Provisional application No. 62/536,311, filed on Jul. 24, 2017.

(51) Int. Cl.
| | | |
|---|---|---|
| *H04N 19/00* | (2014.01) | |
| *H04N 19/182* | (2014.01) | |
| *G06F 21/62* | (2013.01) | |
| *H04N 19/172* | (2014.01) | |
| *G06K 9/00* | (2006.01) | |

(52) U.S. Cl.
CPC ....... *H04N 19/182* (2014.11); *G06F 21/6209* (2013.01); *G06K 9/00456* (2013.01); *H04N 19/172* (2014.11)

(58) Field of Classification Search
CPC H04N 19/182; H04N 19/172; G06F 21/6209; G06K 9/00456
See application file for complete search history.

(56) References Cited

U.S. PATENT DOCUMENTS

| | | | |
|---|---|---|---|
| 5,488,367 A | 1/1996 | Kitamura | |
| 6,996,251 B2* | 2/2006 | Malone | H04N 1/32101 |
| | | | 382/100 |
| 8,843,756 B2* | 9/2014 | Takahashi | H04N 1/448 |
| | | | 358/538 |
| 2005/0114669 A1* | 5/2005 | Ho | H04N 1/41 |
| | | | 713/176 |
| 2006/0030969 A1* | 2/2006 | Norris | B07C 3/14 |
| | | | 700/215 |
| 2019/0026692 A1* | 1/2019 | Dearing | G06Q 10/0833 |

FOREIGN PATENT DOCUMENTS

| | | | |
|---|---|---|---|
| CN | 103390163 B | * | 12/2016 |
| EP | 2104331 A1 | | 9/2009 |

OTHER PUBLICATIONS

International Search Report and Written Opnion dated Oct. 12, 2018 in International Application No. PCT/US2018/043152.

(Continued)

*Primary Examiner* — Khai M Nguyen
(74) *Attorney, Agent, or Firm* — Knobbe Martens Olson & Bear LLP

(57) ABSTRACT

Embodiments of a system and method for secure processing of image data are described. Image data included in image files may be encrypted and compressed in a single step using dynamically identified compression/encryption information such as code word tables.

20 Claims, 5 Drawing Sheets

(56) References Cited

OTHER PUBLICATIONS

Hu et al: "A new lossy compression cheme for encrypted gray-scale images", 2014 IEEE International Conference on Acoustics, Speech and Signal Processing (ICASSP), IEEE, May 4, 2014, pp. 7387-7390, XP032617648.
Huffman, "A method for the construction of minimum redundancy codes," Proceedings of the IRE, vol. 40, Issue 9, Sep. 1952, pp. 1098-1101.
Takashima et al., "Reversible Variable Length Codes," IEEE Transactions on Communications, vol. 43, Issue 2/3/4, Feb./Mar./Apr. 1995, pp. 158-162.

\* cited by examiner

IMAGE ENCRYPTION THROUGH DYNAMIC COMPRESSION CODE WORDS

CROSS-REFERENCE TO RELATED APPLICATION(S)

This application claims the benefit of priority to U.S. Provisional Application No. 62/536,311 filed on Jul. 24, 2017, the entire contents of which is hereby incorporated in its entirety. Furthermore, any and all applications for which a foreign or domestic priority claim is identified in the Application Data Sheet as filed with the present application are hereby incorporated by reference under 37 CFR 1.57.

BACKGROUND

Technical Field

This disclosure relates to image processing, and in particular to dynamic systems and methods for efficient simultaneous encryption and compression of image data included in image files.

Description of the Related Technology

Handling items through processing systems typically includes capturing one or more images of the item as it is being processed. For example, items, such as articles of mail (e.g., letters, flats, parcels, and the like), warehouse inventories, or packages are frequently received into a processing facility in bulk, and must be sorted into particular groups to facilitate further processes such as, for example, delivery of the item to a specified destination. Sorting bulk stacks of items or articles can be done using imaging technologies. The ability to accurately process a given item may be limited by the effectiveness of the imaging technology to extract accurate information about each item. The information may include personal information about the sender or receiver of the item such as name, address, account information, or other information that is provided in trust that public disclosure will be limited if not avoided altogether. Careful handling of the personal information includes careful handling of images taken of the item during processing.

Mail delivery is merely one example of an industrial application that relies on sorting and processing large quantities of items. Others may include, but are not limited to, retail operations with large inventories and high daily sales, high volume component manufacturers, such as consumer goods, baggage sorting, and importing operations with high volumes of imports needing sorting and receiving daily.

SUMMARY

The embodiments disclosed herein each have several aspects no single one of which is solely responsible for the disclosure's desirable attributes. Without limiting the scope of this disclosure, its more prominent features will now be briefly discussed. After considering this discussion, and particularly after reading the section entitled "Detailed Description," one will understand how the features of the embodiments described herein provide advantages over existing systems, devices, and methods for image encryption through dynamic compression code words.

In one innovative aspect, a computer-implemented method performed under control of one or more processors is provided. The computer-implemented method includes obtaining an image file including: (i) first image data representing a mail piece, the image data showing personal information, and (ii) first image metadata identifying a property of the first image data. The property includes at least one of: a format of the first image data, a source of the first image data, a device used to capture the first image data, a time the first image data was captured, a date the first image data was captured, or a location where the first image data was captured. The computer-implemented method further includes extracting, from the first image metadata, a value for the property. The computer-implemented method also includes transmitting a request for a variable length code table for images associated with the property, the variable length code table including encrypted code words for compressing the images and receiving the variable length code table. The computer-implemented method includes generating a compressed and encrypted image file by: (i) copying the first image metadata from the image file to second image metadata of the compressed and encrypted image file; and (ii) compressing and encrypting the first image data into second image data of the compressed and encrypted image file based at least in part on the first image data and the variable length code table. The second image data is represented using less memory than the first image data, and the personal information shown in the first image data is not shown in the second image data. The computer-implemented method further includes storing, in a memory device, the compressed and encrypted image file.

In some implementations of the computer-implemented method, generating the compressed and encrypted image file includes generating a grey-scale image from the first image data. When a grey-scale image is available, compressing and encrypting the first image data may include compressing and encrypting the grey-scale image. The computer-implemented method may include identifying, using an object recognition device, a type for the mail piece shown in the image data. The request may include the type for the mail piece (e.g., a parcel, a pre-printed envelope, or a pre-sorted item).

In some implementations of the computer-implemented method, generating the compressed and encrypted image file may include an identifier for the variable length code table in the second image metadata. The image file may include a tagged image file format image file, and including the identifier may involve adding a tagged field to second image metadata included in the tagged image format image file. The tagged field may include the identifier for the variable length code table.

Embodiments of the computer-implemented method include receiving, from a display device, a view image request including an identifier for the mail piece; retrieving the compressed and encrypted image file from the memory device based at least in part on the identifier; extracting, from the second image metadata, a value for the property; identifying the variable length code table based at least in part on the value extracted from the second image metadata; generating a decompressed and decrypted image file; and transmitting, to the display device, the decompressed and decrypted image file. The decompressed and decrypted image file may be generated by: (i) copying the second image metadata to image metadata for the decompressed and decrypted image file; and (ii) decompressing and decrypting the second image data into third image data for the decompressed and decrypted image file based at least in part on the second image data and the variable length code table. The second image data may be represented using less memory than the third image data, and the personal information shown in the first image data is shown in the third image data.

The computer-implemented method of may include: receiving, in response to the request, a validation time for a first variable length code table; determining that a time when the first variable length code table was received is after the validation time; and transmitting a second request including the property for the variable length code table.

The computer-implemented method of may additionally or alternatively include: generating a processing metric for the image file based at least in part on a comparison of the first image data to the second image data; and storing, in the memory device, the processing metric in association with at least one of the properties of the image file. Example the processing metrics include: a difference in a quantity of memory used to store image data, an entropy difference for the image data, or a difference in an amount of time to store image data on the memory device. In some implementations, the computer-implemented method may include determining that the processing metric exceeds a threshold; and causing generation of a new variable length code word table for encoding and compressing the image data.

In a second innovative aspect, a further computer-implemented method under control or one or more processors is provided. The computer-implemented method includes receiving an image file including a first metadata portion and a first image data portion including first image data showing an item and text affixed thereto. The computer-implemented method includes identifying compression and encryption information associated with the image file. The computer-implemented method includes generating a compressed image file including: (i) a second metadata portion having values obtained from the first metadata portion, and (ii) a second image data portion including second image data compressed and encrypted from the first image data based on the compression and encryption information. The text is not shown in the second image data. The computer-implemented method includes storing the compressed image file in a quantity of memory that is less than a quantity of memory used to store the image file.

Generating the compressed image file may include generating a grey-scale image from the first image data, and compressing the grey-scale image to generate the compressed image file. The computer-implemented method may include identifying, using an object recognition device, a type for the item shown in the image data. The first metadata portion may indicate the type for the item. Example types for an item include parcel, a pre-printed envelope, or a pre-sorted mail piece.

When generating the compressed image file, an identifier for a variable length code table may be included in in the second metadata portion. For example, the image file may be a tagged image file format image file. In such implementations, including the identifier may include adding a tagged field to the second metadata portion included in the tagged image format image file. The tagged field may include the identifier for the variable length code table.

The computer-implemented method of may additionally or alternatively include: receiving, from a display device, a view image request including an identifier for the identifier; retrieving the compressed image file from a memory device based at least in part on the identifier; extracting, from the second metadata, a value for a property of the second image data, the property comprising at least one of: a format of the second image data, a source of the second image data, a device used to capture the second image data, a time the second image data was captured, a date the second image data was captured, or a location where the second image data was captured; identifying the variable length code table based at least in part on the value extracted from the second metadata; generating a decompressed image file; and transmitting, to the display device, the decompressed image file. The decompressed image file may be generated at least in part by: (i) copying the second metadata from compressed image the file to third image metadata for the decompressed image file; and (ii) decompressing the second image data into third image data for the decompressed and decrypted image file based at least in part on the second image data and a variable length code table. The second image data may be represented using less memory than the third image data.

The computer-implemented method of may additionally or alternatively include: receiving, in response to the request, a validation time for a first variable length code table; determining that a time when the first variable length code table was received is after the validation time; and transmitting a second request including the property for the variable length code table.

In a further innovative aspect, an image processing system is provided. The image processing system includes a computer-readable memory storing executable instructions. The image processing system includes one or more computer processors in communication with the computer-readable memory. The one or more computer processors are configured to execute the executable instructions. The executable instructions cause the image processing system to receive an image file associated with an item received at a processing facility, the image file including: (a) a first metadata portion, and (b) a first image data portion including an encrypted image. Address information for a recipient of the item is not shown in the first image data. The executable instructions cause the image processing system to identify compression and encryption information associated with the image file. The executable instructions cause the image processing system to generate a decompressed image file including: (i) a second metadata portion having values obtained from the first metadata portion, and (ii) a second image data portion including second image data decompressed and decrypted from the first image data based on the compression and encryption information. The address information is shown in the second image data. The executable instructions cause the image processing system to receive text information from an optical character recognition system identifying at least a portion of the address information identified in the second image data. The executable instructions cause the image processing system to generate a control signal to adjust an item processing device at the processing facility to thereby direct the item to a destination within the processing facility associated with the port of the address information.

BRIEF DESCRIPTION OF THE DRAWINGS

The foregoing and other features of the disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through use of the accompanying drawings.

DETAILED DESCRIPTION

Figure 1:
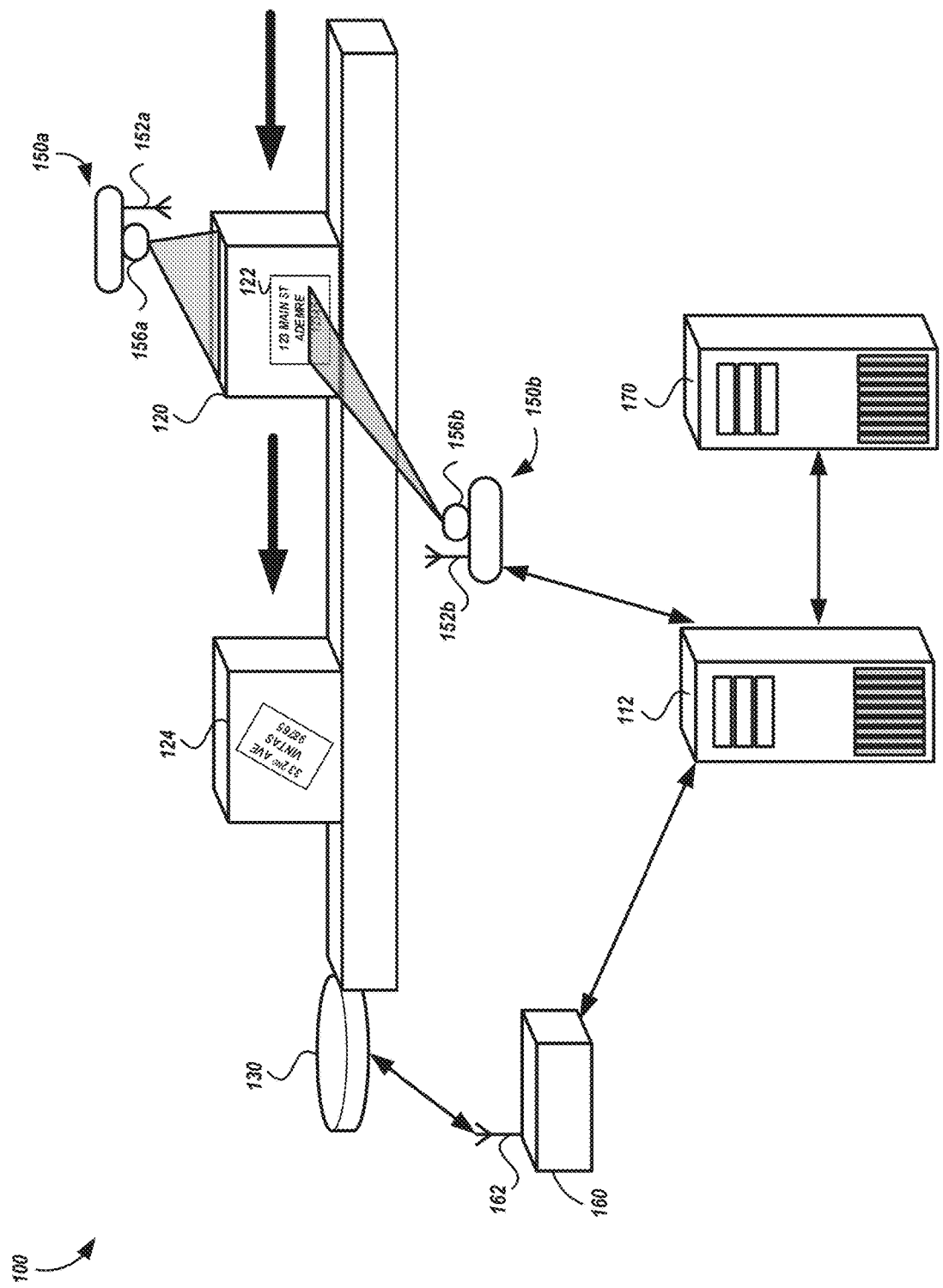
FIG. 1 is a pictorial diagram of an embodiment of system for dynamic processing of items based on image features obtained from images of the items.

In the following detailed description, reference is made to the accompanying drawings, which form a part hereof. In the drawings, similar symbols typically identify similar components, unless context dictates otherwise. Thus, in some embodiments, part numbers may be used for similar components in multiple figures, or part numbers may vary depending from figure to figure. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the Figures, can be arranged, substituted, combined, and designed in a wide variety of different configurations, all of which are explicitly contemplated and made part of this disclosure.

Reference in the specification to "one embodiment," "an embodiment," or "in some embodiments" means that a particular feature, structure, or characteristic described in connection with the embodiment is included in at least one embodiment of the invention. Moreover, the appearance of these or similar phrases throughout the specification do not necessarily all refer to the same embodiment, nor are separate or alternative embodiments necessarily mutually exclusive. Various features are described herein which may be exhibited by some embodiments and not by others. Similarly, various requirements are described which may be requirements for some embodiments but may not be requirements for other embodiments.

The system described herein provides for faster and more efficient image based processing of items, such as, for example, articles of mail. Processing items may include receiving an item, moving an item from one location to another, or presenting an item at a destination address. The processing of items may include one or more mechanical devices to perform a step in a chain of steps to ultimately present the item for delivery. The mechanical devices may include conveyor belts, pinch belt assemblies, singulation and shingulation assemblies, and the like, which can be driven by one or more motors. The mechanical devices may include gates, diverters, selective pickers, vacuum powered members, and the like, which are configured to restrict or permit items to enter a location, or to divert an item in a particular direction for further processing. The mechanical devices may include autonomous vehicles such as robots, drones, cars, or vans. The mechanical devices may be controlled by a central system configured to determine a proposed or intended path for an item through a distribution network, and to track the item along the proposed or intended path, or through any deviations from that path, from receipt to delivery.

The system may follow an item using multiple scanning devices. The scanning devices may include optical scanners. An optical scanner may be implemented as a camera. The camera may capture one or more images of an item as it is being processed. The images may be analyzed to determine future steps for processing the item.

To expedite processing, the image may be compressed. Compression generally refers to generating a data file that takes a smaller quantity of memory than an original, uncompressed data file.

Compressing image files retains at least a portion of the visual information of the original image data. As such, with an appropriate viewing application, a user may open a compressed file to view the image data. One way protect the content of the image file (and thus the image that can be presented based thereon), is to encrypt the compressed image file. Encryption generally refers to a process of rearranging information included in a file to generate an encrypted version of the file. The rearranging may include moving data from one location in the file to another. The rearranging may include changing data in the file. The encryption may rely on an encryption key as a mechanism for determining the rearrangement to use. The encryption key may be symmetric meaning it can also be used to decrypt an encrypted file. To decrypt the image file, a system may receive the encrypted image file and the encryption key. Based at least in part on these inputs, the system may generate an unencrypted image file by reversing the encryption process based at least in part on the encryption key.

In current systems, the process of compression is separate from the process of encoding. This leads to an additional step in the processing of image files which, in turn, can increase the time needed to process a given image. In some implementations, the rate at which image files can be processed, or compressed and encoded, can be a limiting factor in the overall rate at which a processing system can handle items.

The features described provide improved image based processing in part by providing an image processing pipeline that can simultaneous perform compression and encryption of image data. In this way, the expenditure of processing resources to compress image data may also encrypt the image data contained therein in a single pass. In such implementations, the system may generate a compressed and encrypted image file with one read of the original image from memory and one write of the compressed-encrypted image file to memory. These savings are magnified when image compression or encryption includes network transmission between different processing equipment.

For example, one current method of tagged image file format (TIFF) image compression includes using a standardized lossless compression scheme developed by David Huffman at MIT in 1952. This compression scheme may be used millions of times per day to transmit and store image files used for image processing of mail pieces. The Huffman scheme involves the use of a variable length code word table to represent an uncompressed series of binary digits as a much shorter code word. A general method of compression may use a fixed code word table developed and optimized to support binary image compression for specific devices or image (e.g., Fax machine quality images). This fixed table may be predefined any used for rendering compressed image files such as TIFF files.

As discussed, some systems may process items using images that include sensitive information. The security concerns are important, but solutions such as encryption can introduce overhead in the processing of the items. From the perspective of the processing system, the time sensitivity and scale of item processing operations may inhibit encryption as the very nature of encryption has a cost (e.g., increased computer processing cycles). Additionally, the current methods of encryption result in the entire file being encrypted including non-sensitive information (e.g., metadata, tagged image header information, etc.) that may be used for routing and processing the item shown in the image data.

The features described herein merge the compression and encryption processes, utilizing processing during compression to also encrypt data. The features provide several non-limiting advantages over the current processes. The proposed features include dynamically replacing the standard Huffman table or other code word table used for compression with a secure replacement table. The replacement table(s) can specifically be trained for optimized compression and encryption of specific environments, senders, items, etc. or changed throughout time to adapt to changing item types or volumes.

The features may be applied for encryption of only the image data. The features require no additional overhead as compared to using unencrypted images since the decompression includes a decryption. Files may be routed and processed without the need of separate decryption thereby reducing processing time and increasing security of the image. The features also provide an increased ability to configure a compression table based on specific applications or vendors by training the table using test images. The compression table(s) may be dynamic, changing over time to reduce the risk of lost or stolen media. The compression table(s) may also be limited in distribution to only those systems with a "need to know." In such instances, only the software with the matching table is capable of decompressing the image. The compression tables may also be protected from vendors or other third parties to further enhance security and protect any benefits from additional novel training.

As used here, the term "item" or "items" may refer to flats, letters, parcels, residual mail, and the like. Although the present disclosure describes systems and devices for image processing related to articles of mail, such as letters and flats, it will be apparent to one of skill in the art that the disclosure presented herein is not limited thereto. For example, the development described herein may have application in a variety of manufacturing, assembly, distribution, or sorting applications which include processing images including personal or sensitive information at high rates of speed and volume.

As used here, the term "encrypt" or "encryption" generally refers to a procedure to convert first data (e.g., plaintext) into second data (e.g., ciphertext). Typically, the ciphertext version of the second data prevents an unintended recipient from reading or viewing the plaintext data. The conversion may include generating a new file by obtaining the first data, generating second data from at least a portion of the first data using an identified encryption key, and adding the second data to the encrypted file. The encryption key may be a look up table, a public-key, a private-key, or other value influencing the conversion from the first data to the second data. As used here, the term "decrypt" or "decryption" generally refers to a reversing the encryption process to reconstruct a file to present the original, unencrypted plaintext.

As used here, the term "compress" or "compression" generally refers to a process of reducing a quantity of resources used for representing, transmitting, receiving, or storing a file. The resource may include one or more of: memory, network bandwidth, network packets, memory blocks, processor cycles, time to write to memory (e.g., disk), time to read from memory, or the like. Compression may include generating a compressed file from an uncompressed file by reducing the number of bits needed to represent the same information. In some implementations, compression may include losing some clarity from the original image, such as image resolution or color range, to achieve the resource savings. Such compressions may be referred to as lossy compression. Compression with no clarity loss may be referred to as lossless compression. As used here, the term "decompress" or "decompression" generally refers to reversing the compression process to reconstruct a file to present the original file information. As discussed, the reconstruction may not be an identical reconstruction of the original file as some compression schemes are lossy.

FIG. 1 is a pictorial diagram of an embodiment of system for dynamic processing of items based on image features obtained from images of the items. The system 100 may include processing equipment to move items from one location to another. As each item may be destined for unique locations, the processing equipment may need to be dynamically adjusted to suit the needs and destination of each item.

The system 100 is shown processing a first item 120 and a second item 124. A conveyor 110 may include motorized locomotive elements to transport the first item 120 through the processing facility. A turntable 130 may be included in the system 100. The turntable 130 may be selectively adjusted to send items in a particular direction, such as into specific sorting bins. The conveyor 110 and the turntable 130 are just two examples of processing equipment that may be included in the system 100 to receive, process, and deliver items based, at least in part, on one or more control signals. Other examples of processing equipment include: vacuum belts, tilt trays, cross belts, bomb-bay style trap doors, or other conveying mechanisms, bins, robots, trays, forklifts, stackers, printers, sorters (such as Mixed Mail Sorter (MSA-9600) manufactured or sold by Neopost or its affiliates) or the like. The content of a control signal may depend on the type of equipment being controlled and capabilities thereof. The control signal may be provided as a machine readable instruction to adjust one or more operational function of the target processing equipment.

The processing equipment may be controlled using control messages. For example, a controller 160 may transmit a message to the turntable 130 indicating which direction to point for an item that is being processed. The controller 160 may include a wireless transceiver 162 to exchange messages with a control server 112 or processing equipment such as the turntable 130. The messages may be coordinated by the control server 112 such that the processing equipment is in the desired state when the item arrives at the processing equipment.

Scanning devices are additional examples of processing equipment that may be included to track items through the system 100. Optical scanning devices (e.g., optical scanning device 150a and optical scanning device 150b) may capture one or more images of part or all of an item as it is being processed. The optical scanners 150a and 150b may include wireless transceivers 152a and 152b, respectively, for wirelessly transmitting image data to the control server 112. In some implementations, the wireless transceiver 152a may receive control messages from the controller 160. A control message may include parameters for capturing images of the item 120, such as the size of the image, the size of the field to be images, color mode for the image, number of pixels for the image, resolution for the image, or other information to configure a scanner 156a to the capture the image.

As shown in FIG. 1, multiple optical scanning devices may be included in the system 100. The optical scanning device 150a and the optical scanning device 150b may be situated to capture a top image and a side image of the first item 120 using scanners 156a and 156b respectively. In some embodiments, the optical scanners 150a and 150b can have pan-tilt-zoom functionality in order to obtain images of the first item 120a from various directions and angles, and to ensure image quality and readability. Additional scanning devices may be included to capture additional or alternative images of the first item 120. In some implementations, the first item 120 may be rotated to facilitate capturing of images of other portions of the first item 120 without including additional scanners. The coordination of the imaging and rotation may be controlled, in part, through messages from the controller 160.

The images captured by the optical scanning devices may be transmitted to the control server 112. In some implementations, the optical scanning device 150a may compress and encrypt image data in the image file for transmission as described herein. The control server 112 may receive the image file. In some implementations, the optical scanning device 150a may transmit a raw image file (e.g., unencrypted or uncompressed) to the control server 112. The control server 112 may, in turn, compress and encrypt the image file for further processing.

In implementations where the image file received by the control server 112 is encrypted and compressed, the control server 112 may decrypt and decompress the image file as described herein. Once the image data is reconstructed (or in cases where the raw image file is received), the control server 112 may analyze the image data. The analysis may include measuring the item or detecting a computer readable code or performs optical character recognition (OCR) of the image data of part or all of an item in order to identify various characteristics of the item, such as class of service, addressee, and/or delivery end point. Based at least in part on the information identified in at least a portion of the image data showing an item, the control server 112 may identify adjustments to the processing equipment to ensure the item is routed to a target destination.

As shown in FIG. 1, an image processing server 170 may be included in the system 100. The control server 112 may include basic image processing, such as optical character recognition. However, some images may be transmitted to the image processing server 170 for more advanced analysis or processing. The image may be transmitted in the compressed and encrypted form to the image processing server 170.

The image processing server 170 may be a specially configured image processing device for performing detailed image analysis to remove or adjust images requiring such additional processing to obtain the information of interest despite defects in the form or content of the image. For example, the image processing server 170 may include specialized graphics libraries or machine learning models to extract information from an image file including image data showing an item. The information may include object recognition of items represented by the image data. As with the control server 112, the image processing server 170 may first decrypt and decompress the image file for further processing.

In this way, as the image proceeds through the system 100, the actual image data is both compressed and encrypted. When the receiving system accesses the image file, as the image data is extracted, the appropriate table for decompression and decryption may be retrieved. The table may be identified based on non-image data included in the image file. For example, in TIFF image files, the header information may include an identifier that indicates which table was used to compress and encrypt the image data included in the TIFF image file. Other image file formats such as extensible image format files (EXIF) may similarly be processed to provide the encryption and compression features described. In some implementations, the information identifying the table may be separate from the image file. For example, an identifier of the device transmitting the image may be associated with a specific lookup table. In such instances, the receiving device may detect the sending device's IP address or other unique identifier. Alternative or additional information may be used to indicate which compression information should be used for a particular image. For example the creation date of the image may be associated with a specific table for compression and encryption.

An image file may be stored and associated with information about the item shown in the image. For example, the image may include barcode information or return or destination addresses for the item. This information may be used to associate the image with a tracking record for the item in a data base. In some implementations, the storage location of the image may be included in the data base in association with the item record. In some implementations, the data base may be configured to store binary objects such as images, in an item record. To conserve memory resources and provide a secure record, it may be desirable to store the image in compressed and encrypted form. The image data may thus be associated with a record for an item so that when the item is next scanned, the image previously obtained and/or analyzed can be referenced.

Figure 2:
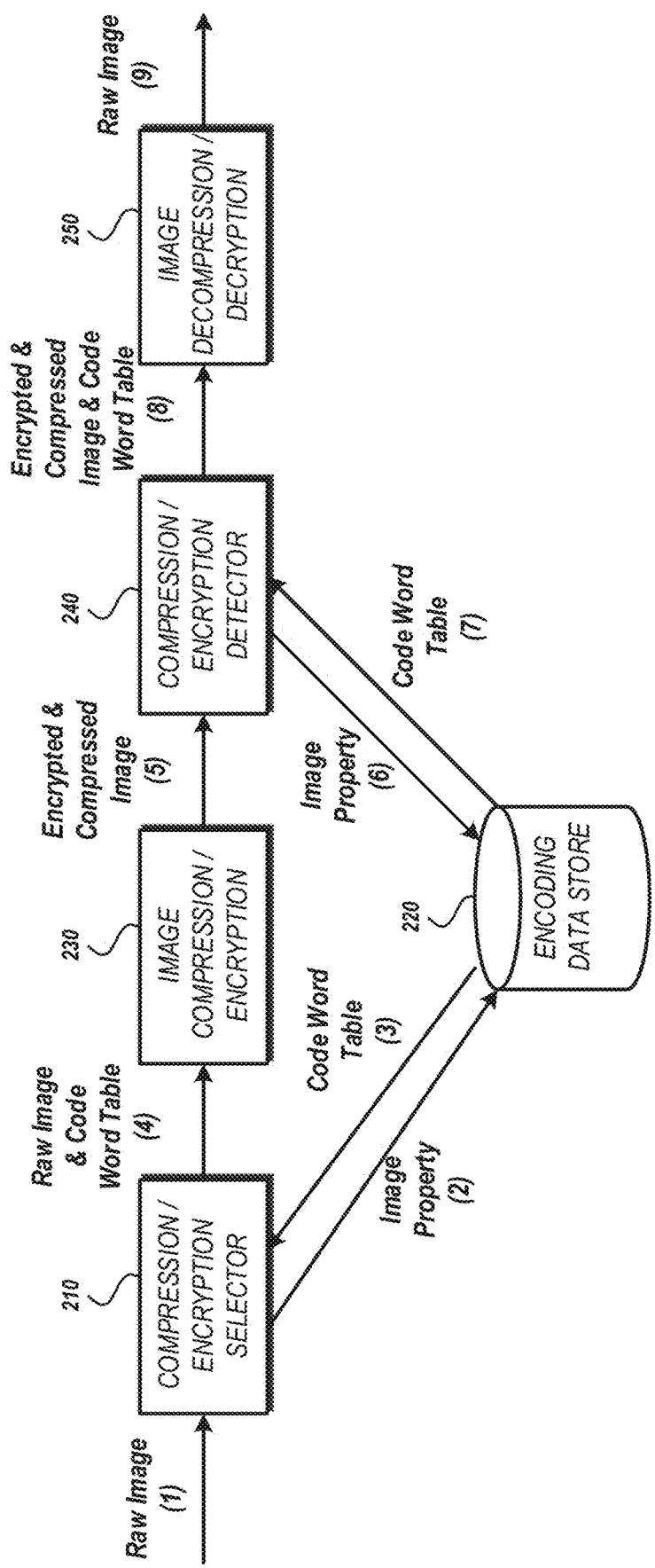
FIG. 2 pictorial diagram of an image handling pipeline including one step compression and encryption.

FIG. 2 is a pictorial diagram of an image handling pipeline including one step compression and encryption. A raw image may be received by a compression/encryption selector 210. All or portions of the pipeline shown in FIG. 2 may be implemented by an optical scanning device, a control server, an image processing server, or any other device that can transmit or receive image data.

The compression/encryption selector 210 may be configured to identify which compression/encryption should be applied for the raw image. The identification may be based on the image data such as the item shown in the image. The identification may be based on metadata included in the raw image file. For example, the metadata may identify a source of the image (e.g., which party captured the image, what device captured the image, a location where the image was captured), a recipient of the image (e.g., what is the target system or usage for the image), date or time when the image was generated (e.g., different table used on different days), or a combination thereof. For purposes of discussion, the compression/encryption selector 210 may extract one or more image property which may include the values discussed. The image properties collected by the compression/encryption selector 210 may be identified using a configuration file specifying, such as for a raw image type (e.g., format) or image source (e.g., device, entity, location), what image properties are needed to identify the compression/encryption for the raw image. In some implementations, the image properties used to identify or compress an image may also be encrypted prior to inclusion in the metadata for the compressed image.

The compression/encryption selector 210 may request the compression/encryption information from an encoding data store 220. The encoding data store 220 may be a device configured to store various compression/encryption information in association with one or more image properties.

The compression/encryption information may include a look-up-table for encoding and encrypting a raw image. The look-up-table may be generated as described herein. In some implementations, the encoding data store 220 may provide a response including the compression/encryption information for the raw image. In some implementations, the response may include information that the compression/encryption selector 210 can use to receive the compression/encryption information. For example, the information may include a uniform resource locator (URL) for a network location storing the compression/encryption information. The information may include a credential to permit access to the network location such as a security token or other means for limiting access to the network location.

As used herein a "data store" may be embodied in hard disk drives, solid state memories and/or any other type of non-transitory computer-readable storage medium accessible to or by a device such as an access device, server, or other computing device described. A data store may also or alternatively be distributed or partitioned across multiple local and/or remote storage devices as is known in the art without departing from the scope of the present disclosure. In yet other embodiments, a data store may include or be embodied in a data storage web service.

As shown in FIG. 2, the compression/encryption information includes a code word table. A code word table generally identifies sequences of values that can be represented using a smaller value. For example, assume a black and white pixel can be represented using "1" for black and "0" for white. In such instances, it may be common to have a particular sequence of white pixels, such as when imaging an envelope. Rather than including a sequence of "0's" for the sequence, a code word may be assigned to represent the string with a single, smaller value (e.g., "32"). Thus, in the compressed and encrypted image file, "32" will be included rather than the sequence of "0's". TABLE 1 below is an example code word table that may be implemented to encode specific pixel sequences (e.g., run lengths).

TABLE 1

| White run length | Code word | Black run length | Code word |
| --- | --- | --- | --- |
| 0 | 00110101 | 0 | 0000110111 |
| 1 | 000111 | 1 | 010 |
| 2 | 0111 | 2 | 11 |
| 3 | 1000 | 3 | 10 |
| 4 | 1011 | 4 | 011 |
| 5 | 1100 | 5 | 0011 |
| 6 | 1110 | 6 | 0010 |
| 7 | 1111 | 7 | 00011 |
| 8 | 10011 | 8 | 000101 |
| 9 | 10100 | 9 | 000100 |
| 10 | 00111 | 10 | 0000100 |
| 11 | 01000 | 11 | 0000101 |
| 12 | 001000 | 12 | 0000111 |
| 13 | 000011 | 13 | 00000100 |
| 14 | 110100 | 14 | 00000111 |
| 15 | 110101 | 15 | 000011000 |
| 16 | 101010 | 16 | 0000010111 |
| 17 | 101011 | 17 | 0000011000 |
| 18 | 0100111 | 18 | 0000001000 |
| 19 | 0001100 | 19 | 00001100111 |
| 20 | 0001000 | 20 | 00001101000 |
| 21 | 0010111 | 21 | 00001101100 |

The compression/encryption information may identify an encryption key used in conjunction with other compression/encryption information (e.g., a code word table). For example, a public key infrastructure (PKI) key may be identified.

The compression/encryption selector 210 may provide the raw image and the code word table to an image compression/encryption device 230. In some implementations the compression/encryption selector 210 and the image compression/encryption device 230 may be commonly implemented using shared hardware such as an optical scanner, control server, or image processing server. The image compression/encryption device 230 may generate an encrypted and compressed image. Generating the compressed and encrypted image may include identifying a sequence of pixel information included in the raw image and adding data to the encrypted and compressed image representing the sequence of pixel information. The data added is typically represented using fewer resources (e.g., memory) than the sequence of pixel information. The data to be added may be identified by the image compression/encryption device 230 by identifying an entry in the code word table corresponding to the sequence.

The compressed and encrypted image may be transmitted directly, or through one or more intermediaries, to a receiving device. The receiving device may include a compression/encryption detector 240. The compression/encryption detector 240 may be configured to identify which compression/encryption was used to generate the compressed and encrypted image. The identification may be based on metadata included in the compressed and encrypted image file. For example, the metadata may identify a source of the image (e.g., which party captured the image, what device captured the image, a location where the image was captured), a recipient of the image (e.g., what is the target system or usage for the image), date or time when the image was generated (e.g., different table used on different days), or a combination thereof. For purposes of discussion, the compression/encryption detector 240 may extract one or more image property which may include the values discussed. The image properties collected by the compression/encryption detector 240 may be identified using a configuration file specifying, such as for an image type (e.g., format) or image source (e.g., device, location, entity), what image properties are needed to identify the compression/encryption for the compressed and encrypted image.

Similar to the compression/encryption selector 210, the compression/encryption detector 240 may submit a request to the encoding data store 230 including one or more of the image properties. The encoding data store 230 may respond with the compression/encryption information used for images corresponding to the image properties provided. As shown in FIG. 2, the compression/encryption selector and compression/encryption detector share a common encoding data store 230. In some implementations, these components may utilize independent data stores. The data stores may be replicated to ensure symmetry for the compression and encryption information. The compression and encryption information may include a code word table. The compression/encryption information may identify an encryption key used in conjunction with other compression/encryption information (e.g., a code word table). For example, a public key infrastructure (PKI) key may be identified.

The compression/encryption detector 240 may provide the compressed and encrypted image and the compression and encryption information received from the encoding data store 230 to an image decompression and decryption device 250. The decompression and decryption device 250 may then generate the raw image by converting the encoded and compressed sequences included in the compressed and encrypted image file to the original pixel information included in the raw image received by the compression/ encryption selector 210. The raw image may then be provided for further processing such as dynamic configuration of processing equipment based on the item shown in the image, tracking an item as it is routed to a final destination, or the like. Other examples include: manual review of an image such as a remote encoding center (e.g., a keyer may open the image and provide an input identify the address for sorting); customer service system (e.g., a representative opens and views a package mail piece image to help troubleshoot mail delivery issues); or to secure images delivered to item recipients or senders reporting delivery status for the item.

Figure 3:
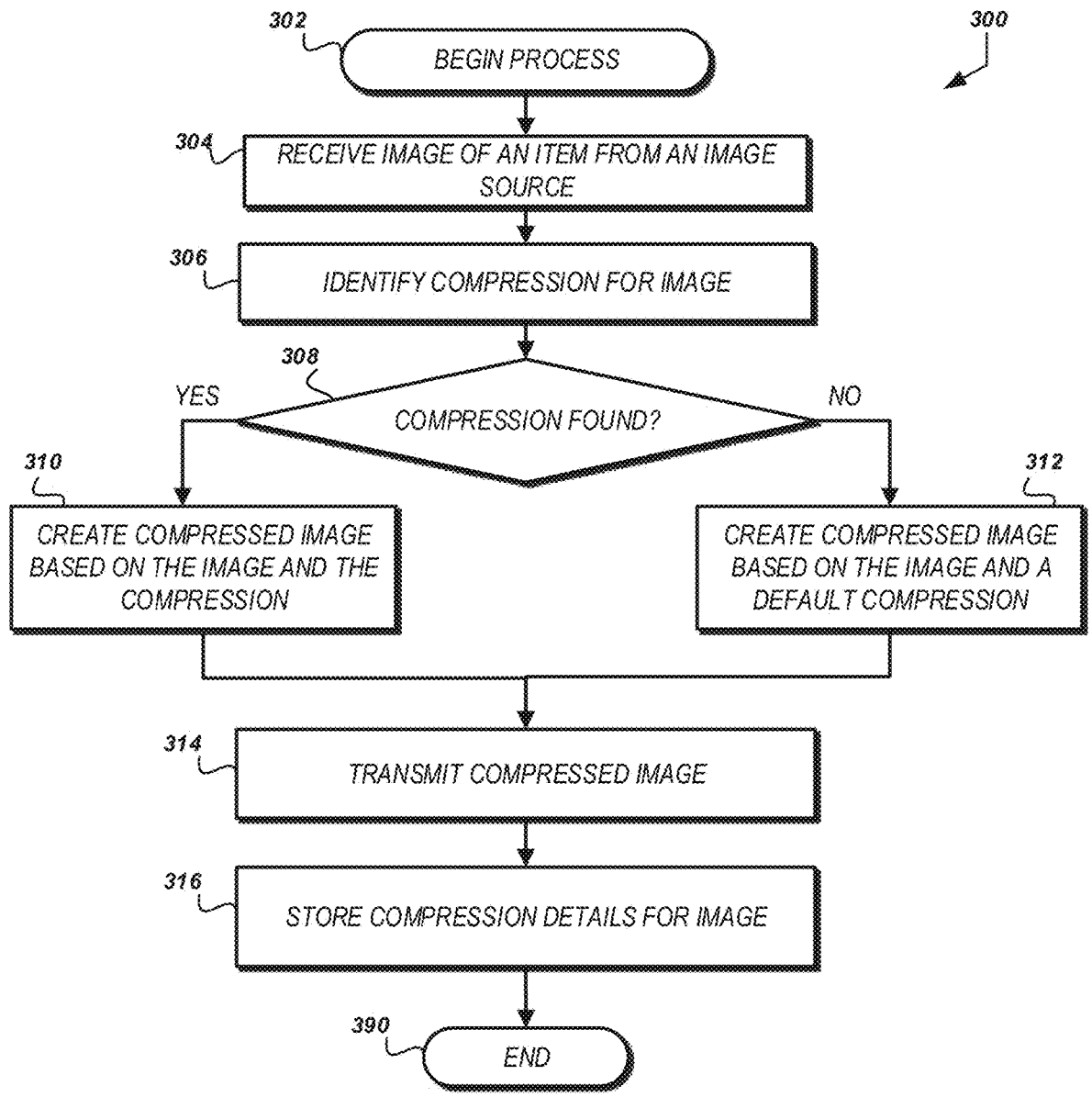
FIG. 3 is a flow diagram illustrating an example method of single-pass compression and encryption of an image.

FIG. 3 is a flow diagram illustrating an example method of single-pass compression and encryption of an image. The method 300 may be implemented by one or more of the devices described herein. The method 300 illustrates one way an image of an item may be compressed and encrypted in a single pass. The method 300 transforms a raw image into a compressed and encrypted image by reading the image from memory once and writing a compressed and encrypted image to memory once. This transformation also represents an improvement to the functioning of an image processing device for secure image processing.

The method 300 begins at block 302. The method 300 assumes that image data showing the item has been acquired, such as by an optical scanning device. At block 304, a compression/encryption selector may receive the image data. The image data may show an item that is being processed by processing equipment such as a conveyor, turntable, automated postage dispenser, handheld delivery scanner, or the like.

At block 306, the compression/encryption selector may identify appropriate compression and encryption for the image file. The identification may include extracting one or more image property from a raw image file. Example image properties include an image type (e.g., format), image size (e.g., memory used to store the image), image source (e.g., device, location, entity), image color mode (e.g., greyscale, color, bi-color), image creation date, image file name, or other metadata for the image file. The image property may also be based on information shown in the image data such as a class of service for the item, quantity of image data, size of the image represented by the image data (e.g., image dimensions), type of item shown in the image data (e.g., parcel, flat, envelop, bulk item, package, irregular, etc.). Based on the extracted properties, the compression/encryption selector may query an encryption data store to obtain the compression and encryption information for the image file.

In some implementations, the information may be stored on a filesystem local to the compression/encryption selector. In some implementations, the information may be received from the encryption data store. When received from a remote location, the compression/encryption selector may temporarily store the information in a cache. The cache may be configured to permit temporary storage of compression and encryption information for a predetermined period of time. After the predetermined period of time, the information may be deleted from the cache. The cache may store the information in an access protected manner to ensure security of the compression and encryption information. The access protected manner may include limiting the users permitted to access the cached information, storing the cached information in secured hardware such as encrypted storage, or the like.

At block 308, a determination is made as to whether encryption and compression information exists for the raw image file. If encryption and compression information is identified, the method 300 continues to block 310 to generate the compressed and encrypted image file. Generating the image at block 310 may include identifying sequences of pixels of the image data included in the raw image file that correspond to code words included in the encryption and compression information (e.g., code word table). The code words may be written to the compressed image file. It will be appreciated that the compressed image file may not be renderable as an image (e.g., on a display).

In some implementations, it may be desirable to generate intermediate image data for compression rather than compressing the image data from the raw image. For example, the raw image may be captured using color or at a resolution that provides a level of detail above threshold needed for the image processing (e.g., image based item routing). In such instances, intermediate greyscale or black and white image data may be generated from the raw image data. The intermediate image data may then be compressed and encrypted. The intermediate image data may be altered in other ways such as by rotating, zooming, or segmenting the image based on objects identified in the image, metadata included in the raw image file, or other image information.

Returning to the discussion of block 308, if it is determined that no encryption or compression information is specified for the raw image file, at block 312, a compressed image file may be generated using a default compression, such as a standard Huffman encoding table. In some implementations, a default compression may also include encryption. For example, a default compression and encryption code word table may be included to ensure a minimal quantity of compression and encryption can be achieved even when a specific format is undefined.

Generating the compressed image file at either block 310 or 312 may include encrypting the code words using an encryption key. For example, the system generating the compressed image file may receive a public key for the system receiving the compressed image file. In such instances, the code word may be identified from the shared code word table, and then further encrypted using the public key before being added to the compressed image file.

At block 314, the compressed image file may be transmitted to a receiving device. For example, the receiving device may be a remote control server for configuring processing equipment to direct the item shown in the image data to a final destination. In some implementations, the receiving device may be an account management system configured to track an item's progress during processing.

At block 316, compression details for the raw image file/image data may be optionally stored. The compression details may be stored in a data store and used to identify common image properties and compression statistics. For example, the image properties used to identify the compression/encryption information may be stored in conjunction with file size information for the raw image file and the compressed image file. Other details may include entropy for the compressed image file, a difference metric between the raw image file and the compressed image file, or other indicator of a level of compression or encryption in the compressed image file. These details may be used to identify types of images that can be improved through the use of a more refined encryption-compression table, such as via the method shown in FIG. 4. The method 300 may end at block 390.

Figure 4:
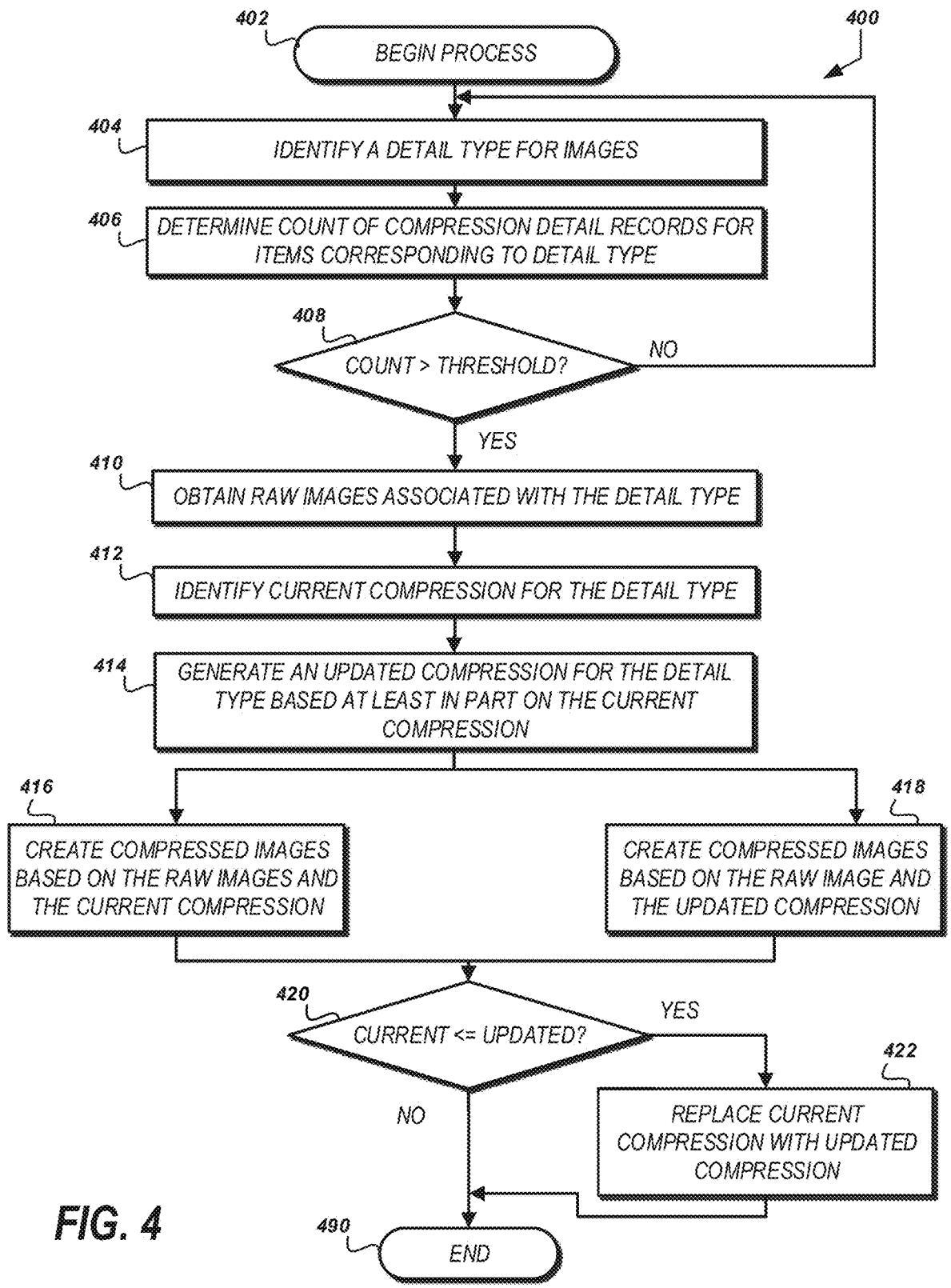
FIG. 4 is a flow diagram illustrating an example method of training an encryption-compression table.

FIG. 4 is a flow diagram illustrating an example method of training an encryption-compression table. The method 400 may be implemented by one or more of the devices described herein. The method 400 illustrates one way an encryption-compression table may be generated.

The method 400 begins at block 402. At block 404, a detail type for an image is identified. The detail type may include an image property or a compression detail such as collected at block 316 of FIG. 3. The identification may be based on a predetermined set of details maintained by the system. The predetermined set of details may be specified in a configuration file.

At block 406, a count of records corresponding to the detail type may be obtained. The count may include records within a threshold of the detail value (e.g., file size within 10% of a specified file size). At block 408, a determination may be made as to whether the count exceeds a threshold. For example, it may be desirable to avoid expending resources for retraining if the number of records is below the threshold. In such instances, the method 400 may return to block 404 to identify a different detail type. If the determination at block 408 is affirmative, then the method 400 may proceed to block 410.

At block 410, a set of raw image files corresponding to the detail type may be received. The set of raw images may be stored locally or received from an image source. The raw image files may represent examples of images for compression that correspond to the detail of interest. In machine learning, the set of raw image files may be referred to as training data.

At block 412, current compression and encryption information for the raw image file may be identified. The identification may be similar to the identification performed by the compression/encryption selector shown in FIG. 2 based on one or more properties of an image file. In some implementations, a training configuration may include an identifier for the current compression and encryption information (e.g., identifier for a code word table). The identification may be based on a duration of time since compression information was generated for the image. For example, it may be desirable to generate a new table for a particular image source every six months.

At block 414, updated compression information may be generated based at least in part on the current compression and encryption information. The updated compression information may include associating different sequences of pixel data with different code words. The updated compression may be independent of the current compression and encryption information. In such instances, a new table may be generated for the raw image files. Examples of training a code word tables are described in: Huffman "A method for the construction of minimum redundancy codes" (September 1952), Takishima et al. "Reversible Variable Length Codes" (April 1995), and U.S. Pat. No. 5,488,367 entitled "Method of and apparatus for generating variable length code word table," each of these references are hereby incorporated by reference in its entirety. It will be appreciated that the generating at block 414 includes generating a code word table that both compresses and encrypts the image data. Block 414 may include an additional step in generating the code word table to further translate code words generated by the cited references into encrypted values.

At block 416, a compressed image file is generated using the current compression information. At block 418, a compressed image file is generated using the updated compression information. Generating a compressed image file may include identifying a sequence of pixel information from an image data portion of a raw image file and adding a record to the compressed image file representing the sequence using fewer resources (e.g., memory) than used by the sequence. The record to be added may be identified by comparing the sequence to an entry in the respective code word table. By generating two compressed images, one with the current compression information and another with the new compression information, a comparison between the quality of compression/encryption achieved can be performed.

At block 420, compression details for images compressed using the current and updated compression may be compared. For example, if the updated compression information provides compressed files with an average size (e.g., memory use) that is less than an average for the current compression, the updated compression information may be deemed more desirable. As another example, if entropy in files compressed with the updated information exceeds (e.g., on average, or a count of number files exceeding) the entropy of the current compression, the updated compression may be deemed more desirable. In some implementations, the determination at block 420 may compare a composite metric formed from one or more compression details.

If the updated compression information provides a metric indicating a more desirable level of compression or encryption, the determination at block 420 may be affirmative and the method 400 may proceed to block 422. At block 422, the current compression information may be replaced with the updated compression information. Replacing at block 422 may include transmitting the updated compression information to one or more devices that receive or process the raw images. The replacing at block 422 may include storing the updated compression information in an encoding data store or a location referenced by a record in the encoding data store associated with the set of raw images. In some implementations, the updated compression information may be associated with an activation date. In such instances, the updated compression information may be used for compressing and encrypting image files as of the activation date. The activation data may be identified based at least in part on an activation configuration value identifying a quantity of time needed to disseminate a new compression and encryption table. Once replaced, the method 400 may end at block 490.

Returning to block 420, if the method 400 determines that the current compression information provides a higher level of compression or encryption than the updated compression information, it may be desirable to maintain the current compression information rather than incur the resources to disseminate a new table. The method 400 may end at block 490. In some implementations, the method 400 may return to block 414 to generate another updated table to generate a new table to replace the current table. For example, when the current table is deemed compromised or has aged, it may be desirable to generate a replacement table. In such instances, the method 400 may continue blocks 414, 416, 418, and 420 until the updated table provides the same or better compression and encryption than the current table.

Figure 5:
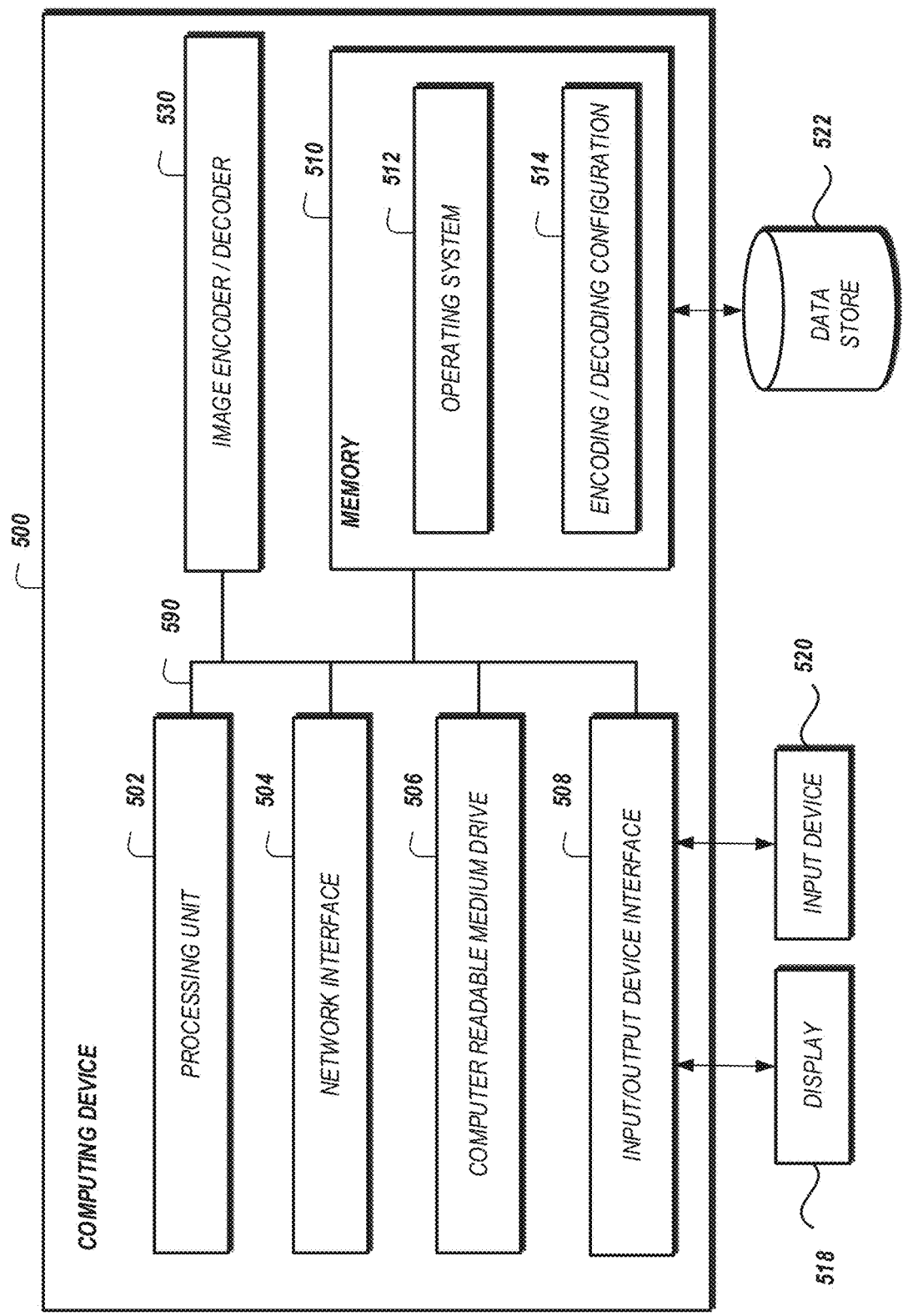
FIG. 5 is a block diagram of an embodiment of a computing device for compressing and decompressing images with encryption.

FIG. 5 is a block diagram of an embodiment of a computing device for compressing and decompressing images with encryption. The computing device 500 can be a server or other computing device, and can comprise a processing unit 502, an image encoder/decoder 530, a network interface 504, a computer readable medium drive 506, an input/output device interface 508, and a memory 510. The computing device 500 may implement the features of one or more of the compression/encryption selector, the compression/encryption detector, the image compression/encryption device, or the image decompressions/decryption device. The computing device 500 may be configured to perform all or a portion of the methods shown in FIG. 3 or 4.

The network interface 504 can provide connectivity to one or more networks or computing systems. The processing unit 502 can receive information and instructions from other computing systems or services via the network interface 504. The network interface 504 can also store data directly to memory 510. The processing unit 502 can communicate to and from memory 510 and output information to an optional display 518 via the input/output device interface 508. The input/output device interface 508 can also accept input from the optional input device 520, such as a keyboard, mouse, digital pen, microphone, mass storage device, etc.

The memory 510 may contain computer program instructions that the processing unit 502 executes in order to implement one or more embodiments. The memory 510 generally includes RAM, ROM, and/or other persistent, non-transitory computer readable media. The memory 510 can store an operating system 512 that provides computer program instructions for use by the processing unit 502 or other elements included in the computing device in the general administration and operation of the computing device 500. The memory 510 can further include computer program instructions and other information for implementing aspects of the present disclosure.

For example, in one embodiment, the memory 510 includes an encoding/decoding configuration 514. The encoding/decoding configuration 514 may include image properties associated with particular image files or needed for identifying compression and encryption information to compress or decompress an image file, or other information supporting the image file operations or training of the tables used therein (e.g., metrics to asses quality of encryption/compression, thresholds, etc.). The encoding/decoding configuration 514 may store specific values for a given configuration. The encoding/decoding configuration 514 may, in some implementations, store information for obtaining values for a given configuration. For example, an encoding information service configured to provide encoding tables may be specified as a network location (e.g., URL) in conjunction with username and password information to access the service. In such implementations, a message including image file properties (or a portion thereof) may be provided to the service. A response message may include the code table for processing the image file, if available.

The memory 510 may also include or communicate with one or more auxiliary data stores, such as data store 522. The data store 522 may electronically store data regarding mail pieces, image files, or compression details (e.g., metrics) therefore.

The elements included in the computing device 500 may be coupled by a bus 590. The bus 590 may be a data bus, communication bus, or other bus mechanism to enable the various components of the computing device 500 to exchange information.

In some embodiments, the computing device 500 may include additional or fewer components than are shown in FIG. 5. For example, a computing device 500 may include more than one processing unit 502 and computer readable medium drive 506. In another example, the computing device 502 may not be coupled to a display 518 or an input device 520. In some embodiments, two or more computing devices 500 may together form a computer system for executing features of the present disclosure.

Described are various features for concurrent image compression and encryption. The features described herein may be embodied in additional or alternative implementations.

The features may be implemented as a computer-implemented method. The method may be performed under control of one or more processors. The method includes obtaining an image file. The image file may include at least two distinct portions. One portion may include first image data representing a mail piece, the image data showing personal information. As discussed, it may be desirable to provide an efficient way to protect the personal information. A second portion may include first image metadata identifying a property of the first image data. Examples of a property of the first image data include a format of the first image data, a source of the first image data, a device used to capture the first image data, a time the first image data was captured, a data the first image data was captured, or a location where the first image data was captured. The method may include extracting, from the first image metadata, a value for the property. The method may then transmit a request for a variable length code table for images associated with the property, the variable length code table including encrypted code words for compressing the images and receive the variable length code table. The method may further include generating a compressed and encrypted image file. The generation includes copying the image metadata from the image file to second image metadata included in the compressed and encrypted image file. The generation also includes compressing and encrypting the first image data into second image data included in the compressed and encrypted image file based at least in part on the first image data and the variable length code table. The second image data is represented using less memory than the first image data and the personal information shown in the first image data is not shown in the second image data. The compressed and encrypted image file may be stored in a memory device for further processing as described herein.

In some implementations, the method may include generating the compressed and encrypted image file by generating a grey-scale image from the first image data. In such implementations, compressing and encrypting the first image data may compress and encrypt the grey-scale image.

The method may include identifying, using an object recognition device, a type for the mail piece shown in the image data, wherein the request includes the type for the mail piece. The object recognition device may be a specially programmed computing device including image feature recognition or other machine learning models trained to identify objects shown in an image. The type may include at least one of a parcel, a pre-printed envelope, or a pre-sorted item (e.g., a pre-sorted mail piece).

Generating the compressed and encrypted image file may include including an identifier for the variable length code table in the second image metadata. For example, the image file may be a tagged image file format image file. In such implementations, including the identifier may include adding a tagged field to second image metadata included in the tagged image format image file. This tagged field may include the identifier for the variable length code table used to compress/encrypt the compressed and encrypted image file.

Additional or alternative features may be included in the method. For example, the method may include receiving, from a display device, a view image request including an identifier for the mail piece. The method may retrieve the compressed and encrypted image file from the memory device based at least in part on the identifier and extract, from the second image metadata, a value for the property. Extracting the value may include identifying a location for the value within the metadata. The location may be identified based on a tag (e.g., TIFF tag, XML tag), a defined metadata location (e.g., fixed length field, header field), or similar metadata locations. The configuration used for image processing may identify the image property along with information identifying the location of the value (e.g., which tagged field, the header field, etc.). The method may include identifying the variable length code table based at least in part on the value extracted from the second image metadata. The method may include generating a decompressed and decrypted image file. The process of generating the decompressed and decrypted image file may include copying the image metadata from the file to second image metadata included in the compressed and encrypted image file and decompressing and decrypting the second image data into third image data included in the decompressed and decrypted image file. The decompressing and decrypting may be based at least in part on the second image data and the variable length code table. The second image data is represented using less memory than the third image data and the personal information shown in the first image data is shown in the third image data. The method may include transmitting, to the display device, the decompressed and decrypted image file.

It may be desirable to limit when, where, or who may use a particular variable length code table. For example, the method may include receiving, in response to the request, a validation time for a first variable length code table and determining that a time when the first variable length code table was received is after the validation time. In such instances, it may be desirable to transmit a second request including the property for the variable length code table. In this way, old compression/encryption information can be expired to limit harm from unintended disclosure of a particular version of the compression/encryption information.

Some methods may include generating a processing metric for the image file based at least in part on a comparison of the first image data to the second image data. The processing metric may be based on a count of the number of images having a particular set of properties processed by the method (e.g., how many images from a particular source, showing a particular item or mail piece, or having a particular file format). Such methods may include storing, in the memory device, the processing metric in association with at least one of the properties of the image file. Examples of the processing metric include: a difference in a quantity of memory used to store image data, an entropy difference for the image data, a difference in an amount of time to store image data on the memory device, or some combination thereof. The code word tables may vary based on the target application, size of the table or time since last version of the table was generated. If the processing metric is tracked, the method may determine that the processing metric exceeds a threshold and cause generation of a new variable length code word table for encoding and compressing the image data.

Another example computer-implemented method including the features described herein may include, under control of one or more processors, receiving an image file including a first metadata portion and a first image data portion including first image data showing an item and address information affixed thereto. The method includes identifying compression and encryption information associated with the image file. The method further includes generating an compressed image file including: (i) a second metadata portion having values obtained from the first metadata portion, and (ii) a second image data portion including second image data compressed and encrypted from the first image data based on the compression and encryption information, wherein the address information is not shown in the second image data. The method further includes storing the compressed image file in a quantity of memory that is less than a quantity of memory used to store the image file.

The features described may be embodied in an image processing system. For example, an image system may include a scanning device configured to acquire an image of an item at a first processing device. The image processing system may include an image processing server. The image processing server is configured to receive an image file including a first metadata portion and a first image data portion including the image. The image processing system is further configured to identify compression and encryption information associated with the image file. The image processing system is further configured to generate an compressed image file including: (i) a second metadata portion having values obtained from the first metadata portion, and (ii) a second image data portion including second image data compressed and encrypted from the first image data based on the compression and encryption information. The address information is not shown in the second image data. The server is further configured to store the compressed image file in a quantity of memory that is less than a quantity of memory used to store the image file.

In some implementations, a non-transitory computer readable medium having stored thereon instructions which when executed by at least one computing device performs all or a portion of the methods described.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as specialized hardware, or as specific software instructions executable by one or more hardware devices, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. An image processing system can be or include a microprocessor, but in the alternative, the image processing system can be or include a controller, microcontroller, or state machine, combinations of the same, or the like configured to generate and analyze indicator feedback. An image processing system can include electrical circuitry configured to process computer-executable instructions. Although described herein primarily with respect to digital technology, an image processing system may also include primarily analog components. For example, some or all of the image file analysis and rotation notation features described herein may be implemented in analog circuitry or mixed analog and digital circuitry. A computing environment can include a specialized computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in specifically tailored hardware, in a specialized software module executed by an image processing system, or in a combination of the two. A software module can reside in random access memory (RAM) memory, flash memory, read only memory (ROM), erasable programmable read-only memory (EPROM), electrically erasable programmable read-only memory (EEPROM), registers, hard disk, a removable disk, a compact disc read-only memory (CD-ROM), or other form of a non-transitory computer-readable storage medium. An exemplary storage medium can be coupled to the image processing system such that the image processing system can read information from, and write information to, the storage medium. In the alternative, the storage medium can be integral to the image processing system. The image processing system and the storage medium can reside in an application specific integrated circuit (ASIC). The ASIC can reside in an access device or other monitoring device. In the alternative, the image processing system and the storage medium can reside as discrete components in an access device or other item processing device. In some implementations, the method may be a computer-implemented method performed under the control of a computing device, such as an access device or other item processing device, executing specific computer-executable instructions.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each is present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing, and the like.

As used herein, the term "selectively" or "selective" may encompass a wide variety of actions. For example, a "selective" process may include determining one option from multiple options. A "selective" process may include one or more of: dynamically determined inputs, preconfigured inputs, or user-initiated inputs for making the determination. In some implementations, an n-input switch may be included to provide selective functionality where n is the number of inputs used to make the selection.

As used herein, the terms "provide" or "providing" encompass a wide variety of actions. For example, "providing" may include storing a value in a location for subsequent retrieval, transmitting a value directly to the recipient, transmitting or storing a reference to a value, and the like. "Providing" may also include encoding, decoding, encrypting, decrypting, validating, verifying, and the like.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

All references cited herein are incorporated herein by reference in their entirety. To the extent publications and patents or patent applications incorporated by reference contradict the disclosure contained in the specification, the specification is intended to supersede and/or take precedence over any such contradictory material.

The term "comprising" as used herein is synonymous with "including," "containing," or "characterized by," and is inclusive or open-ended and does not exclude additional, unrecited elements or method steps.

The above description discloses several methods and materials of the present invention. This invention is susceptible to modifications in the methods and materials, as well as alterations in the fabrication methods and equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A computer-implemented method comprising:
   obtaining, by at least one of an optical scanning device, a control server, an image processing server, or a computing device configured to transmit or receive image data, an image file including:
   (i) first image data representing a mail piece, the first image data showing personal information; and
   (ii) first image metadata identifying a property of the first image data, the property comprising at least one of: a format of the first image data, a source of the first image data, a device used to capture the first image data, a time the first image data was captured, a date the first image data was captured, or a location where the first image data was captured;
   extracting, by the at least one of the optical scanning device, the control server, the image processing server, or the computing device, from the first image metadata, a value for the property;
   transmitting, to an encoding data store, a request for a variable length code table for images associated with the property, the variable length code table including encrypted code words for compressing the images;
   receiving the variable length code table from the encoding data store;
   generating, by the at least one of the optical scanning device, the control server, the image processing server, or the computing device, a compressed and encrypted image file by comprising second image data and second image metadata, wherein the generating comprises:
   (i) copying the first image metadata from the image file to the second image metadata of the compressed and encrypted image file; and
   (ii) compressing and encrypting the first image data into the second image data of the compressed and encrypted image file based at least in part on the first image data and the variable length code table, wherein the second image data is represented using less memory than the first image data, and wherein the personal information shown in the first image data is not shown in the second image data; and
   storing, in a memory device, the compressed and encrypted image file.

2. The computer-implemented method of claim 1, wherein generating the compressed and encrypted image file comprises generating a grey-scale image from the first image data, and wherein compressing and encrypting the first image data comprises compressing and encrypting the grey-scale image.

3. The computer-implemented method of claim 1, further comprising:
   identifying, using an object recognition device, a type for the mail piece shown in the first image data, wherein the request for the variable length code table includes the type for the mail piece.

4. The computer-implemented method of claim 3, wherein the type comprises at least one of a parcel, a pre-printed envelope, or a pre-sorted item.

5. The computer-implemented method of claim 1, wherein generating the compressed and encrypted image file comprises providing an identifier for the variable length code table in the second image metadata.

6. The computer-implemented method of claim 5, wherein the image file comprises a tagged image file format (TIFF) image file, wherein providing the identifier comprises adding a tagged field to the second image metadata included in the TIFF image file, and wherein the tagged field includes the identifier for the variable length code table.

7. The computer-implemented method of claim 1, further comprising:
   receiving, from a display device, a view image request including an identifier for the mail piece;
   retrieving the compressed and encrypted image file from the memory device based at least in part on the identifier for the mail piece;
   extracting, from the second image metadata comprising the first image metadata, the value for the property of the first image data;
   identifying the variable length code table based at least in part on the value extracted from the second image metadata;
   generating a decompressed and decrypted image file by, wherein the generating comprises:
   (i) copying the second image metadata to third image metadata for the decompressed and decrypted image file; and
   (ii) decompressing and decrypting the second image data into third image data for the decompressed and decrypted image file based at least in part on the second image data and the variable length code table, wherein the second image data is represented using less memory than the third image data, and wherein the personal information shown in the first image data is shown in the third image data; and
   transmitting, to the display device, the decompressed and decrypted image file.

8. The computer-implemented method of claim 1, further comprising:
   receiving, in response to the request for the variable length code table, a validation time for a first variable length code table;
   determining that a time when the first variable length code table was received is after the validation time; and
   transmitting a second request including a property for the variable length code table.

9. The computer-implemented method of claim 1, further comprising:
   generating a processing metric for the image file based at least in part on a comparison of the first image data to the second image data; and
   storing, in the memory device, the processing metric in association with at least one of the properties of the image file.

10. The computer-implemented method of claim 9, wherein the processing metric comprises one of: a difference in a quantity of memory used to store image data, an entropy difference for the image data, or a difference in an amount of time to store the image data on the memory device.

11. The computer-implemented method of claim 9, further comprising:
    determining that the processing metric exceeds a threshold; and
    causing generation of a new variable length code word table for encoding and compressing the first image data.

12. A computer-implemented method comprising:
    receiving, by at least one of an optical scanning device, a control server, an image processing server, or a computing device configured to transmit or receive image data, an image file including a first metadata portion and a first image data portion including first image data showing an item and text affixed thereto;

identifying, by the at least one of the optical scanning device, the control server, the image processing server, or the computing device, compression information associated with the image file;

generating, by the at least one of the optical scanning device, the control server, the image processing server, or the computing device, a compressed image file including: (i) a second metadata portion having values obtained from the first metadata portion, and (ii) a second image data portion including second image data compressed from the first image data based on the compression information, wherein the text is not shown in the second image data; and storing the compressed image file in a quantity of memory that is less than a quantity of memory used to store the image file.

13. The computer-implemented method of claim 12, wherein generating the compressed image file comprises:

generating a grey-scale image from the first image data; and compressing the grey-scale image to generate the compressed image file.

14. The computer-implemented method of claim 12, further comprising:

identifying, using an object recognition device, a type for the item shown in the first image data, wherein the first metadata portion indicates the type for the item.

15. The computer-implemented method of claim 14, wherein the type comprises at least one of a parcel, a pre-printed envelope, or a pre-sorted mail piece.

16. The computer-implemented method of claim 12, wherein generating the compressed image file comprises providing an identifier for a variable length code table in the second metadata portion.

17. The computer-implemented method of claim 16, wherein the image file comprises a tagged image file format (TIFF) image file, wherein providing the identifier comprises adding a tagged field to the second metadata portion included in the TIFF image file, and wherein the tagged field includes the identifier for the variable length code table.

18. The computer-implemented method of claim 12, further comprising:

receiving, from a display device, a view image request including an identifier for the item;

retrieving the compressed image file from a memory device based at least in part on the identifier;

extracting, from the second metadata portion of the compressed image file having the values obtained from the first metadata portion, a value for a property of the first image data, the property comprising at least one of: a format of the first image data, a source of the first image data, a device used to capture the first image data, a time the first image data was captured, a date the first image data was captured, or a location where the first image data was captured;

identifying a variable length code table based at least in part on the value extracted from the second metadata portion;

generating a decompressed image file, wherein the generating comprises:

(i) copying the second metadata portion from the compressed image file to third image metadata for the decompressed image file; and (ii) decompressing the second image data into third image data for the decompressed image file based at least in part on the second image data and the variable length code table, wherein the second image data is represented using less memory than the third image data; and transmitting, to the display device, the decompressed image file.

19. The computer-implemented method of claim 12, further comprising:

receiving, in response to a request for a variable length code table, a validation time for a first variable length code table;

determining that a time when the first variable length code table was received is after the validation time; and transmitting a second request including property for the variable length code table.

20. An image processing system comprising:

a computer-readable memory storing executable instructions; and one or more computer processors in communication with the computer-readable memory, wherein the one or more computer processors are configured to execute the executable instructions to at least:

receive an image file associated with an item received at a processing facility, the image file including: (a) a first metadata portion, and (b) a first image data portion including an encrypted image, wherein address information for a recipient of the item is not shown in the first image data portion;

identify compression and encryption information associated with the image file;

generate a decompressed image file including: (i) a second metadata portion having values obtained from the first metadata portion, and (ii) a second image data portion including second image data decompressed and decrypted from the first image data portion based on the compression and encryption information, wherein the address information is shown in the second image data;

receive text information from an optical character recognition system identifying at least a portion of the address information shown in the second image data; and generate a control signal to adjust an item processing device at the processing facility to thereby direct the item to a destination within the processing facility associated with the identified portion of the address information.

\* \* \* \* \*

UNITED STATES PATENT AND TRADEMARK OFFICE
CERTIFICATE OF CORRECTION

PATENT NO. : 10,757,425 B2  
APPLICATION NO. : 16/040414  
DATED : August 25, 2020  
INVENTOR(S) : Ryan J. Simpson Page 1 of 1

It is certified that error appears in the above-identified patent and that said Letters Patent is hereby corrected as shown below:

In the Claims

Column 23, Line 31, Claim 1, delete "file by" and insert -- file --.

Column 24, Line 17, Claim 7, delete "by," and insert -- , --.

Column 26, Line 22, Claim 19, delete "including" and insert -- including a --.

Signed and Sealed this
First Day of June, 2021

Drew Hirshfeld
*Performing the Functions and Duties of the*
*Under Secretary of Commerce for Intellectual Property and*
*Director of the United States Patent and Trademark Office*